(12) United States Patent
Sieradzki

(10) Patent No.: US 11,110,658 B2
(45) Date of Patent: Sep. 7, 2021

(54) SYSTEM AND METHOD FOR AUTOMATED SUCCESSIVE THREE-DIMENSIONAL PRINTING

(71) Applicant: R3 Printing, Inc., Wilmington, DE (US)

(72) Inventor: Paul Sieradzki, Los Angeles, CA (US)

(73) Assignee: R3 Printing, Inc., Wilmington, DE (US)

(*) Notice: Subject to any disclaimer, the term of this patent is extended or adjusted under 35 U.S.C. 154(b) by 0 days.

(21) Appl. No.: 16/946,188

(22) Filed: Jun. 9, 2020

(65) Prior Publication Data

US 2020/0298486 A1  Sep. 24, 2020

Related U.S. Application Data

(62) Division of application No. 15/801,016, filed on Nov. 1, 2017, now Pat. No. 10,723,075.

(Continued)

(51) Int. Cl.
| | |
|---|---|
| *B29C 64/245* | (2017.01) |
| *B33Y 10/00* | (2015.01) |
| *B29C 64/379* | (2017.01) |
| *B29C 64/00* | (2017.01) |
| *B29C 64/255* | (2017.01) |
| *B29C 64/295* | (2017.01) |
| *B29C 64/227* | (2017.01) |
| *B29C 64/106* | (2017.01) |
| *B33Y 30/00* | (2015.01) |
| *B33Y 40/00* | (2020.01) |
| *B29C 64/205* | (2017.01) |

(Continued)

(52) U.S. Cl.
CPC .......... *B29C 64/245* (2017.08); *B29C 64/00* (2017.08); *B29C 64/227* (2017.08); *B29C 64/255* (2017.08); *B29C 64/295* (2017.08); *B29C 64/379* (2017.08); *B29C 64/393* (2017.08); *B33Y 10/00* (2014.12); *B29C 64/106* (2017.08); *B29C 64/205* (2017.08); *B33Y 30/00* (2014.12); *B33Y 40/00* (2014.12); *B33Y 50/02* (2014.12)

(58) Field of Classification Search
CPC .. B29C 64/245; B29C 64/227; B29C 64/2015
See application file for complete search history.

(56) References Cited

U.S. PATENT DOCUMENTS

| | | |
|---|---|---|
| 5,939,008 A | 8/1999 | Comb et al. |
| 6,177,182 B1 | 1/2001 | Nguyen |

(Continued)

FOREIGN PATENT DOCUMENTS

| | | |
|---|---|---|
| CN | 103231513 A | 8/2013 |
| CN | 103481672 A | 1/2014 |

(Continued)

*Primary Examiner* — Jacob T Minskey
*Assistant Examiner* — Virak Nguon
(74) *Attorney, Agent, or Firm* — MG Miller Intellectual Property Law LLC

(57) ABSTRACT

A system and method for autonomously creating subsequent physical objects using a 3-dimensional printer. The system includes a build platform that melts or sublimates at a lower temperature and pressure than the glass-transition temperature of the printed object, allowing the printed object to become detached and removed from the build area with minimal force.

6 Claims, 4 Drawing Sheets

Related U.S. Application Data

(60) Provisional application No. 62/416,428, filed on Nov. 2, 2016.

(51) Int. Cl.
   *B29C 64/393* (2017.01)
   *B33Y 50/02* (2015.01)

(56) References Cited

U.S. PATENT DOCUMENTS

| | | | |
|---|---|---|---|
| 6,202,734 B1 | 3/2001 | Sackinger et al. | |
| 6,722,872 B1 | 4/2004 | Swanson et al. | |
| 7,383,768 B2 | 6/2008 | Reichwein et al. | |
| 7,585,450 B2 | 9/2009 | Wahlstrom et al. | |
| 7,600,547 B2 | 10/2009 | Yang | |
| 7,690,909 B2 | 4/2010 | Wahlstrom | |
| 8,215,371 B2 | 7/2012 | Batchelder | |
| 8,387,167 B2 * | 3/2013 | Matsunobu | B29C 59/022 2/161.1 |
| 8,668,859 B2 | 3/2014 | Pettis | |
| 8,905,742 B2 | 12/2014 | Knighton | |
| 8,961,167 B2 | 2/2015 | Swanson et al. | |
| 8,994,592 B2 | 3/2015 | Scott et al. | |
| 9,085,098 B2 | 7/2015 | Albrecht et al. | |
| 9,085,130 B2 | 7/2015 | Chen et al. | |
| 9,289,946 B2 * | 3/2016 | Perez | B29C 64/379 |
| 2003/0014865 A1 | 1/2003 | Nowak et al. | |
| 2005/0220983 A1 | 10/2005 | Hayes | |
| 2007/0075461 A1 | 4/2007 | Hunter et al. | |
| 2008/0149299 A1 | 6/2008 | Slaughter | |
| 2008/0244887 A1 | 10/2008 | Barlier et al. | |
| 2009/0241997 A1 | 10/2009 | Tafoya | |
| 2010/0279007 A1 | 11/2010 | Briselden et al. | |
| 2013/0186558 A1 | 7/2013 | Comb et al. | |
| 2013/0287933 A1 | 10/2013 | Kaiser et al. | |
| 2013/0287934 A1 | 10/2013 | Ramsundar | |
| 2013/0327917 A1 | 12/2013 | Steiner et al. | |
| 2013/0344258 A1 | 12/2013 | Covey | |
| 2014/0014493 A1 | 1/2014 | Ryan | |
| 2014/0035995 A1 | 2/2014 | Chou et al. | |
| 2014/0178588 A1 | 6/2014 | Swanson | |
| 2014/0220168 A1 | 8/2014 | Perez et al. | |
| 2015/0035209 A1 | 2/2015 | Shah et al. | |
| 2015/0054193 A1 | 2/2015 | Meyer | |
| 2015/0060403 A1 | 3/2015 | Carter et al. | |
| 2015/0064047 A1 | 3/2015 | Hyde et al. | |
| 2015/0077215 A1 | 3/2015 | Ranky et al. | |
| 2015/0125335 A1 | 5/2015 | Bruck et al. | |
| 2015/0140158 A1 | 5/2015 | Cervantes et al. | |
| 2015/0210007 A1 | 7/2015 | Durand et al. | |
| 2015/0217367 A1 * | 8/2015 | Dickey | B29C 64/112 164/133 |
| 2015/0024169 A1 | 9/2015 | Martin | |
| 2015/0251360 A1 | 9/2015 | Steele | |
| 2015/0276119 A1 | 10/2015 | Booker | |
| 2016/0096326 A1 | 4/2016 | Naware | |
| 2016/0167089 A1 * | 6/2016 | Ng | B29C 64/118 428/319.3 |
| 2016/0288415 A1 * | 10/2016 | Fromm | B29C 64/379 |
| 2017/0021419 A1 | 1/2017 | Ng | |
| 2017/0036403 A1 * | 2/2017 | Ruff | C09D 109/08 |
| 2017/0106594 A1 * | 4/2017 | Gardiner | B29C 64/135 |
| 2017/0252819 A1 * | 9/2017 | Gibson | B22F 10/10 |
| 2017/0297320 A1 | 10/2017 | Swanson | |
| 2018/0169940 A1 | 6/2018 | Dunne | |
| 2018/0169942 A1 * | 6/2018 | Jessen | B29C 64/129 |
| 2019/0134909 A1 | 5/2019 | Nicaise | |

FOREIGN PATENT DOCUMENTS

| | | |
|---|---|---|
| CN | 103551572 A | 2/2014 |
| CN | 203485447 U | 3/2014 |
| CN | 203590485 U | 5/2014 |
| CN | 103121323 B | 12/2014 |
| CN | 203992400 U | 12/2014 |
| CN | 104416159 A | 3/2015 |
| CN | 204249367 U | 4/2015 |
| CN | 104646670 A | 5/2015 |
| CN | 104923782 A | 9/2015 |
| CN | 104889397 B | 5/2017 |
| WO | 2015050886 A1 | 4/2015 |
| WO | 2015108574 A1 | 7/2015 |
| WO | 2015110600 A1 | 7/2015 |
| WO | 2015112998 A1 | 7/2015 |
| WO | 2015149054 A1 | 10/2015 |
| WO | 2016094329 A1 | 6/2016 |
| WO | 2016184994 A1 | 11/2016 |
| WO | 2017209337 A1 | 12/2017 |

* cited by examiner

SYSTEM AND METHOD FOR AUTOMATED SUCCESSIVE THREE-DIMENSIONAL PRINTING

CLAIM OF PRIORITY

This application is a divisional of U.S. patent application Ser. No. 15/801,016, filed with the United States Patent and Trademark Office on Nov. 1, 2017, which claims priority to U.S. Provisional Patent Application No. 62/416,428, filed in the United States Patent and Trademark Office on Nov. 2, 2016, both of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a system and method for automated successive three-dimensional printing. More particularly, the present disclosure relates to a system and method for automated successive three-dimensional printing which can operate without a human being present.

BACKGROUND

Additive manufacturing (also known as "3D printing") is performed by a special-purpose device which operates by depositing thin layers of thermoplastic or other reformable or reactive material onto a flat planar surface. This is done by depositing said material between precise points until the sum of all layers forms the ultimate shape of a desired object. One requirement that this type of system has is that the first layer of material deposited on the build surface must adhere to that surface. This adhesion is important because it ensures that the forces of the subsequent material being deposited does not change the position of the first layer relative to all subsequent layers. While a lateral shift of any layer results in inaccurate printing, a shift in the first layer typically results in catastrophic failure of the print job.

This adhesion requirement introduces a certain "Goldilocks" paradigm: a print surface must provide sufficient adhesion such that the risk of first layer detachment over the course of a print job is sufficiently low, yet not so much adhesion that the desired object is now permanently fused to the build platform. Put simply, a build platform that provides too much adhesion requires significant physical force to remove the object, while a build platform with too little adhesion causes the printer to be unreliable or inaccurate.

Already existing in the art are a number of solutions to address this adhesion requirement, however each solution has significant limitations or drawbacks. Such solutions include painter's tape, ultra-hold hair spray, and polyimide tape. Each of these materials are produced by a variety of companies, each with their own specific chemical formulations. However, a common drawback of all these materials is that they lack staying power. That is, they all wear out or become damaged during the removal of the print, possibly after only a single use.

Another solution to the adhesion requirement of 3D printing is to have the build platform be inherently adhesive. To address ejecting the printed objects, some of these build platforms are constructed out of a flexible base material, which allows the end user to apply a bending force to the build platform to unstick the printed object from the build platform.

Regardless of the composition of the build platform, most 3D printers that exist today merely leave the completed object on the build platform, waiting for the user to manually remove the object so that the next print job can initialize. This creates a bottleneck in the production of 3D-printed objects, preventing 3D printing from being used as a manufacturing tool. Because of this, 3D printers cannot automatically process their print queues, and cannot be operated with any kind of autonomy. For 3D printers to fulfill the vision as deliverers of digital ideas into our physical world, a mechanism for removing a print job from the build platform is necessary.

One solution to this automated ejection problem is the "Automated Build Platform" product offered as an aftermarket add-on kit by MakerBot Industries, disclosed in U.S. Pat. Nos. 8,282,380 and 8,287,794. There, the build platform surface is constructed out of a thin, flexible substance concatenated with itself to form a closed-loop, movable conveyor belt, supported by an underlying flat hard surface. Once printing is completed, the conveyor belt advances using the rotational force of motorized frictional cylinders on one end, and the object detaches from the flexible surface at the rotating point, also pushing it from the completed build platform. The movement of the build surface as a conveyor belt both provides the detaching force at the rotation point as well as the linear movement of the object out of the build space. However, when implemented in real-world printers, warping of the object proved to be an insurmountable problem as a print bed that ejects warped objects is not functional. That is, the upward curling force of uneven thermoplastic cooling was too great for the thin surface material to counteract, and objects with large surface areas were either too warped to be acceptable, warped to the point of causing catastrophic print failure, or in the event of a small object not being large enough to warp, too well-adhered to be removed by the rotating force of the surface. Attempts were made to correct this by constructing the build platform out of thin metal, like titanium. Notwithstanding the dramatically increased cost of a titanium build platform, large objects still produced the devastating warping effects that the thin metal couldn't counteract.

Another solution that exists today is taught in U.S. Pat. No. 9,289,946. That solution leverages the mechanical advantage of a wedge and uses a blade to apply a separating force to break the bonds between the bottom surface of the printed object and the printing surface. Further, the blade's motion-path back to its starting position doubles as the force to push the now-separated object out from the build volume. Alternatively, this blade/wedge-separation method may employ a secondary, separate device to remove the object from the print area after separation to similar effectiveness at the cost of increased expenses and mechanical complexity, should there be an engineering reason to do so. However, this solution is mechanically complex and has limits on the size of objects that can be ejected because as an object's bottom surface area increases, the force of adhesion between the object and the build platform increases as well. Therefore, the force needed to drive a blade underneath the first layer of the build object increases drastically with the footprint of the build object. Additionally, the blade may dull over time, requiring sharpening or replacement, adding to a printer's maintenance overhead. The blade also requires exact calibration, as the blade must run along the surface of the build platform, but not cause damage or excessive wear to it. Finally, this mechanism requires additional space alongside an arbitrary axis of the build surface area, decreasing the printer-size-to-build-volume ratio of the 3D printer.

The most prolific automated solution to ejecting printed objects from the build platform is the automated application of a large brute force on the completed object. This force is sufficient such that the bottom layer of the printed object detaches from the build platform and the object's momentum moves it out from the printer's build volume, freeing the printer to initialize a subsequent print. This is achieved via a dedicated ramming device or via the print head itself. The success of this method is firstly dependent on the condition that the force on the object is sufficient such that separation occurs between the object and the build platform, as there is no mechanical advantage to this method. In the case of using the print head to ram the object off the build platform, the components that support the print head must be able to withstand this force. Typically, the supports are precision-machined guide rods, which, for small objects, are sufficient. However, for large objects with a high degree of adhesion to the build surface, the force of impact may be sufficient to permanently deform the rods that allow the motion of the print head, effectively breaking the printer until they are replaced. This method also requires that the adhesion between layers of the object is higher than the adhesion between the object and the build surface, otherwise the object would shear at an arbitrary z-height, which could cause either errors or breakage of the printer when attempting to print the next object. With this method being effective only for printed objects that are strong in their inherent shape and small in their surface area contact with the print platform, this method leaves much to be desired.

Another solution is taught by International Patent Application No.: WO 2015/116639. This invention consists of two critical components: a flexible, flat planar build surface; and a two-part mechanical system to deform this surface along one axis and then also to vacate the now-freed completed object from the build surface. The combination of deformable planar surface and mechanical system serve to replace the need for human labor to clear a printer's build surface for a subsequent print to commence. This method is dependent on the aforementioned "goldilocks" build platforms which are constructed out of a flexible metal surface coated with a substance that increases desirable adhesion properties between printed plastic and the build platform, or a flexible non-metal material that inherently has desirable adhesion properties. Between the coated-metal vs. proprietary inherent material flexible products, flatness of the build surface is difficult to achieve or is highly expensive. Additionally, the natural fatigue of both metal and polymer flexible build products must be considered. After certain flex/flatten cycles, the material may either begin to crack or degrade from the stress, or possibly no longer be able to return to a fully flattened state—a hard-stop for accurate 3D printing, again leaving much room for improvement.

As can be seen based on the above solution, the current state of the art only provides very compromised options, either limiting the type of object that can be printed or adding significant mechanical complexity and chemical-manufacturing dependencies to the 3D printer itself.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

The present disclosure teaches a print area, for accepting and subsequently ejecting an object printed thereon by a 3-dimensional printer, the print area comprising: a build plane; a build platform constructed entirely out of a material with a melting point between 40° C. and 55° C., having a top surface, a bottom surface, and a reservoir configured to contain the build platform; a push mechanism, having a horizontal actuator attached to a plow, where the plow is located proximately to the build platform, wherein the actuator is configured to provide sufficient force to eject the object beyond the holding bracket; and a temperature regulator, located below the bottom surface. Preferably, the build platform is constructed out of a material with a melting point between 25° C. and 60° C., which is preferably gallium. Also preferably, the temperature regulator is a Peltier device. In some embodiments, the print area also has a tray housed within the reservoir attached to a lift mechanism having a vertical actuator having a top end connected to the tray. Preferably, the tray is hingably attached to the top end of the actuator. In other embodiments, during the step of cooling by the temperature regulator, the temperature changes such that the build surface deposits within the reservoir.

The present disclosure also teaches a method of ejecting an object from a print area, the object being printed by a 3-dimensional printer, the print area comprising a build plane, a build platform, having a top surface, a bottom surface, and a reservoir that extends therebetween and surrounds the build platform, a push mechanism, having a horizontal actuator attached to a plow, where the plow is located proximately to the build platform, wherein the horizontal actuator is configured to provide sufficient force to eject the object beyond the build platform, and a temperature regulator, located below the bottom surface, wherein an air-tight chamber envelopes the build platform, the push mechanism, and the temperature regulator, the method comprising the steps of: providing, by the 3-dimensional printer, a printed object, wherein the printed object is adhered to the top surface of the build platform; heating the build platform, by the temperature regulator, to a sublimation point of the build platform; allowing, the build platform to sublimate and the object to become disjoined from the top surface of the build platform; pushing object off the build platform by the plow of the push mechanism. In other embodiments, the print area has an air-tight chamber enveloping the build platform and the push mechanism, and optionally also envelops the temperature regulator. Preferably, the build platform is constructed out of iodine in this configuration. In an alternative embodiment, there is a pressure modulator configured to regulate the pressure within the air-tight chamber. In another embodiment of the method in accordance with the present disclosure, the step of heating the build platform is followed by the step of changing the pressure in the air-tight chamber by a pressure modulator. In a further embodiment, during the step of cooling, the temperature regulator and pressure modulator change the temperature and pressure such that the build surface deposits within the reservoir.

This invention addresses the need for an automated method of creating subsequent physical objects using additive manufacturing, a process colloquially known as "3D printing." By using a variety of electrochemical and/or electromechanical enhancements to the traditional static print bed, a 3D printer deploying the disclosed methods could process its print queue without human intervention. The methods pursued herein aim to circumvent limitations present in attempts outlined in the prior art by being feasible with both delicate printed parts that cannot withstand large moments of force against them, or large objects with a considerable surface area interface between the printed part and the build platform.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1A:
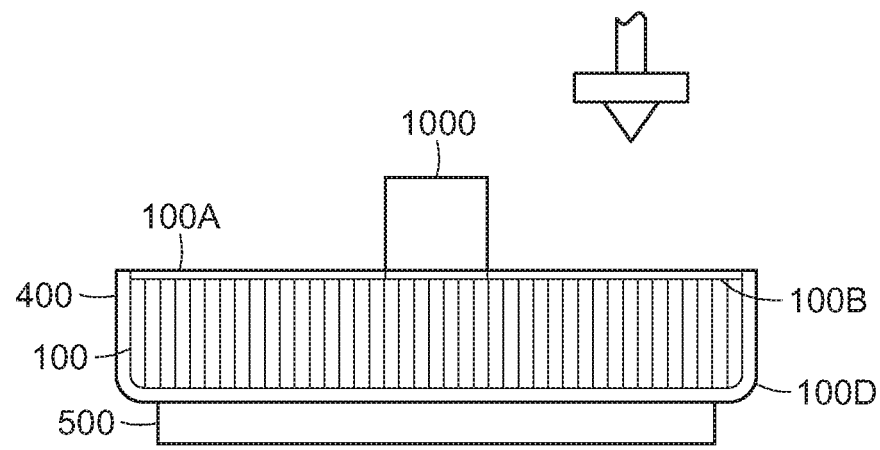
FIG. 1A is a side view, showing another example embodiment of the build platform according to the present disclosure, with a print object disposed thereon.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Exhibited below are several solutions for solving the problem of printing subsequent objects using additive manufacturing hardware without human intervention between each such print jobs.

Figure 1B:
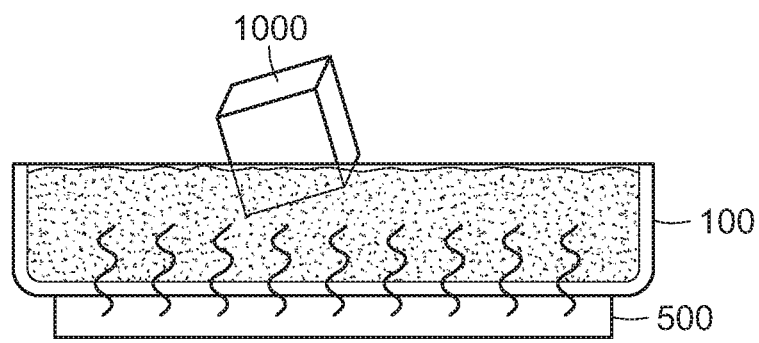
FIG. 1B is a side view, showing the build platform of FIG. 1A, wherein the top surface of the build platform has been melted.
Figure 1C:
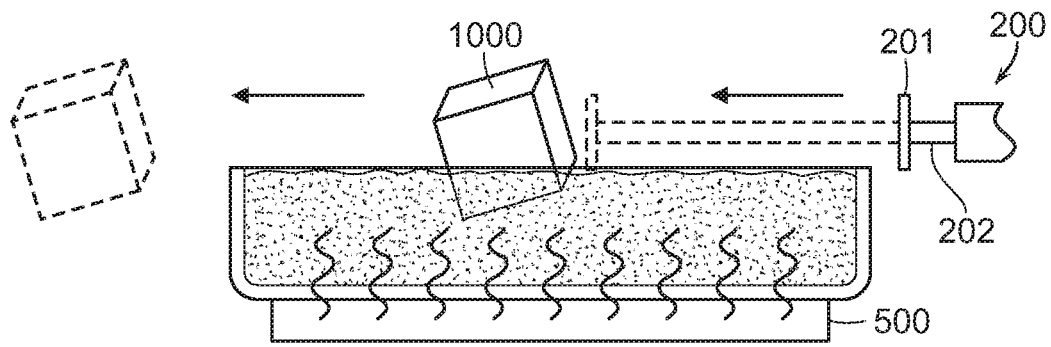
FIG. 1C is a side view, showing the build platform of FIG. 1B, with the print object being ejected from the melted top surface via a push mechanism.

FIGS. 1A-1F show an alternative embodiment of the print area according to the present disclosure. As shown in FIG. 1A, the print area includes the build platform 100, a temperature controller 500 located beneath the build platform 100, and the build plane 400 which is level with the build platform 100. This embodiment of the build platform 100 includes a top surface 100A, a bottom surface 100B, and a reservoir 100D that extends between the top surface 100A and the bottom surface 100B and surrounds the build platform 100. Of note here is the composition of the build platform 100. In the embodiments shown in FIGS. 1A-1F, the build platform 100 is constructed out of a metal, alloy, or other substance that can readily and reversibly change phase, and that has a melting temperature lower than that of the material that the object 1000 is constructed out of. This substance should have a melting temperature in the range of 25° C. to 65° C. A more preferred range is between 35° C. and 55° C., and a highly preferred range is between 40° C. and 55° C. This melting of the build platform 100, in relation to the object 1000, is shown in FIG. 1B.

Figure 1D:
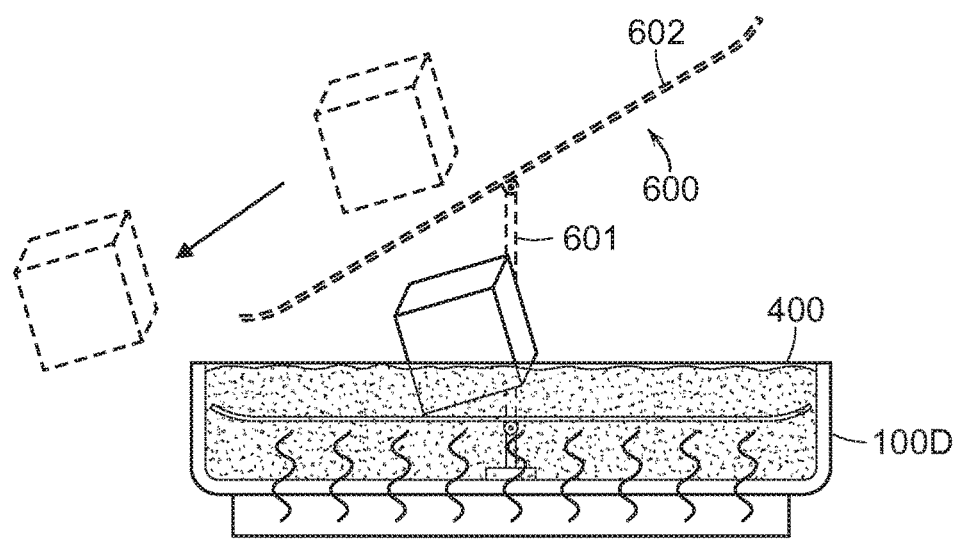
FIG. 1D is a side view, showing the build platform of FIG. 1B, with the print object being ejected from the melted top surface via a lift mechanism.
Figure 1E:
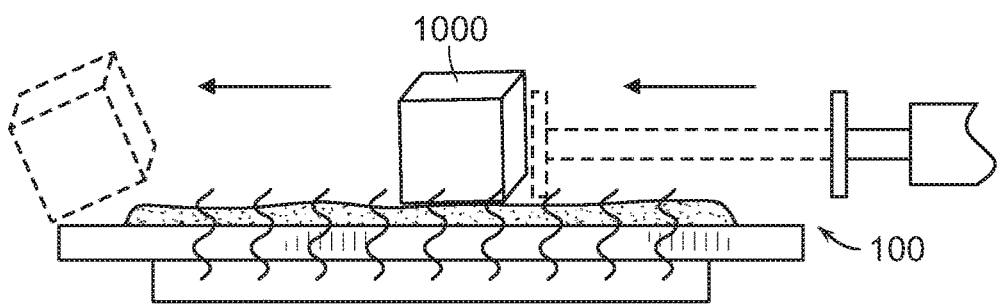
FIG. 1E is a side view, showing an example embodiment of the build platform according to the present disclosure, with the print object being ejected from the melted top surface via a push mechanism.

While the object 1000 is being printed on the build platform 100, the build platform 100 is solid. Upon completion of the 3D printing process, the build platform 100 is heated by the temperature controller 500. The temperature controller 500 can be either an electric resistive heater, or a Peltier device. However, a Peltier device is beneficial as it provides the added functionality of being able to cool whatever it is attached to as well, allowing for materials with a melting point closer to room temperature to be used in the build platform 100. This is beneficial as it can more readily prepare the build platform 100 for subsequent printing and has the ability to lower the temperature of the build platform 100 in the event that it becomes critically high. However, resistive heaters are far smaller and less expensive, so there exist other embodiments which employ a resistive heater to cause the phase change in the build platform 100. In some embodiments, only the top surface 100A of the build platform 100 is constructed out of this phase-changing material, as shown in FIG. 1E.

Regardless of interim conditions of the print area, upon the melting of the build platform 100, there is no force keeping the completed object 1000 stationary on the build platform 100. As such, the object 1000 can be removed from the print area without the use of significant effort. Various mechanisms can be used to eject the completed object 1000 from the build platform 100 upon the melting of the build platform 100. One mechanism is the push mechanism 200, shown in FIG. 1C. Here, the push mechanism 200 includes a plow 201 attached to a horizontal actuator 202. Upon the melting of the build platform 100, the push mechanism 200 will use the plow 201 to eject the object 1000 beyond the build platform 100.

In some embodiments, it may be advantageous to have the reservoir 100D extend above the build plane 400 such that melted build platform 100 doesn't spill beyond the reservoir 100D. As most materials are less dense in their liquid form, this is an important consideration. However, if the reservoir 100D extends above the build plane 400, the use of the push mechanism 200 could potentially damage the object 1000. Accordingly, an alternative ejection mechanism is contemplated by the present disclosure. As shown in FIG. 1D, the print area also includes a lift mechanism 600 having a vertical actuator 601 and a tray 602. Preferably, the tray 602 will be hingably attached to the vertical actuator 601.

Also of note for the embodiments shown by FIGS. 1A-1F, when used in conjunction with 3D printers using fused deposition modeling ("FDM"), fused filament fabrication ("FFF"), or extrusion-added construction ("EAC") technologies, it is ideal that the melting temperature of the build platform 100 is not only lower than the melting temperature of the object 1000, but also that the melting temperature is lower than the glass-transition temperature of the material being printed. If this temperature is higher than the glass-transition temperature of the object 1000, melting the build platform 100 could possibly lead to warping, deformation, or collapse of the object 1000. However, it is also important to note that if the melting temperature of the build platform 100 is too low, then the heat absorbed while printing the first few layers of the object 1000 could cause premature melting or softening of the build platform material. For this reason, gallium or its alloys is an example of a highly preferred material for the build platform 100, as pure gallium melts at 29.77 degrees Celsius. Ideally, a gallium-alloy which has a melting temperature in the 40° C. to 55° C. range is used. This is below one of the lowest glass-transition temperatures of common 3D printing thermoplastics, that of PLA which is 60-65 degrees Celsius, making it very suitable for this application.

Figure 1F:
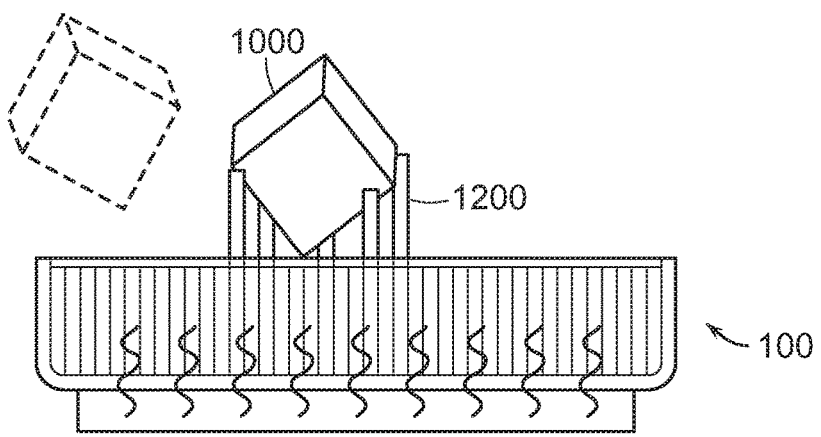
FIG. 1F is a side view, showing an example embodiment of the build platform where the print object is supported by a support mechanism which is capable of melting.

In FIG. 1F, an alternative embodiment of the print area is shown. Here, the build platform 100 is similar to the other embodiments shown in FIGS. 1A-1E, however, the 3D printer deposits additional phase-changing material on top of the build platform 100. That is, the 3D printer prints a custom support structure 1200 to support the object 1000 against gravity as required, whereby the object 1000 can be easily deposited thereon. After the object 1000 has been successfully printed, the support structure 1200 will change phase and will no longer be adhered to the object 1000. The support structure 1200 can be deposited by the same head that prints the object 1000 or may be deposited by a separate print head. Here, the phase change is melting and the support structure 1200 could be printed at a particular temperature, preferably at the melting point of the material the support structure 1200 is constructed out of, such that the support structure 1200 would cool below the melting temperature and solidify in the custom desired shape.

Figure 2A:
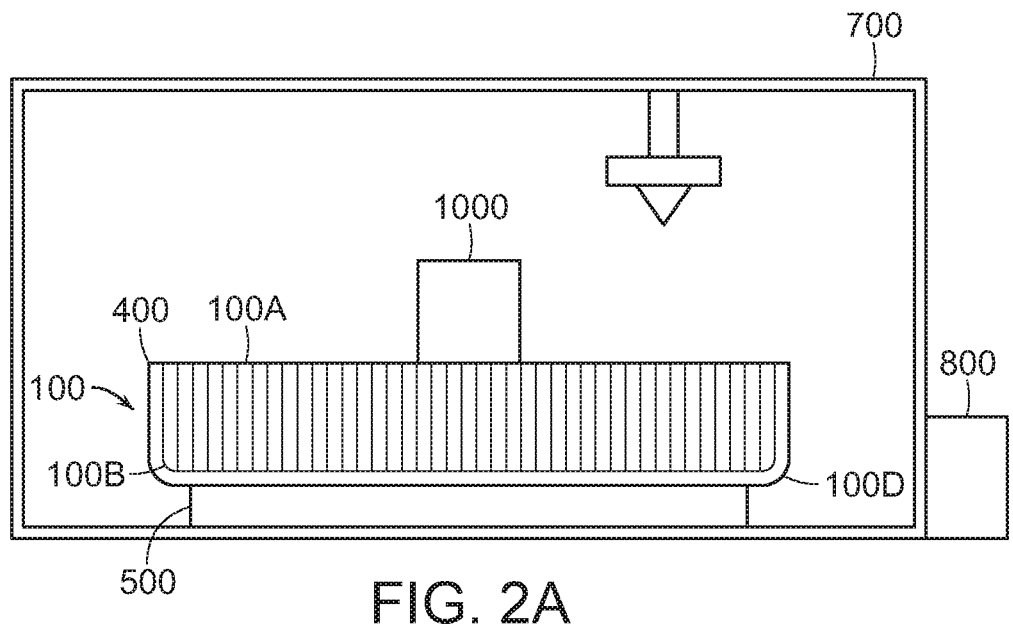
FIG. 2A is a side view, showing another example embodiment of the build platform according to the present disclosure, with a print object disposed thereon.
Figure 2B:
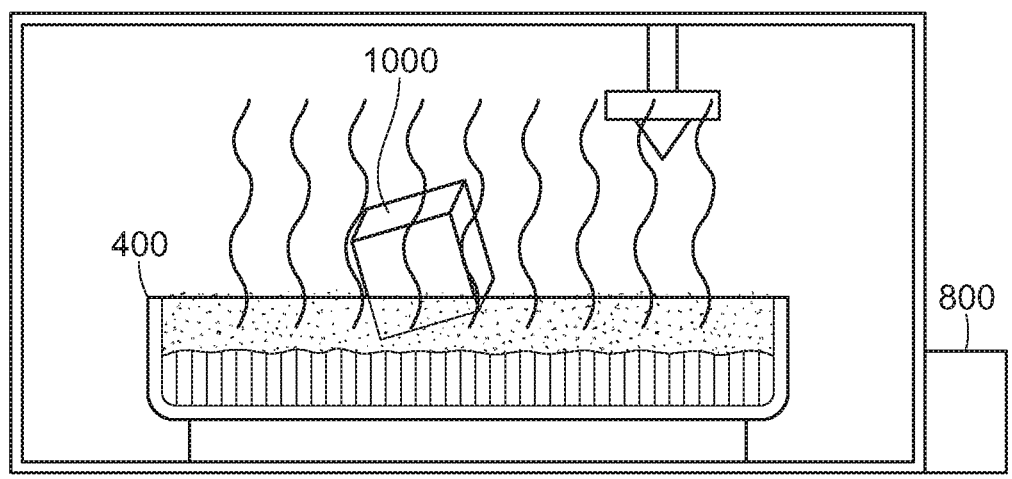
FIG. 2B is a side view, showing the build platform of FIG. 2A, wherein the top surface of the build platform has been sublimated.
Figure 2C:
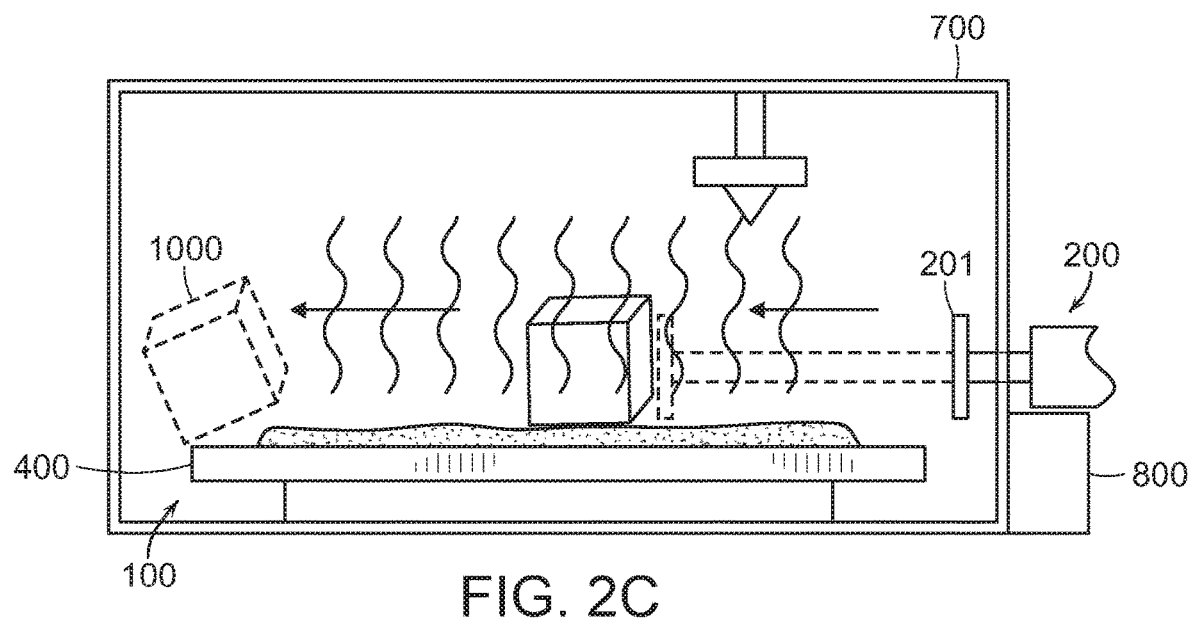
FIG. 2C is a side view, showing the build platform of FIG. 2B, with the print object being ejected from the sublimated top surface via a push mechanism.

Referring to FIGS. 2A-2D, yet another embodiment of the print area according to the present disclosure is provided. As shown in FIG. 2A, the print area includes the build platform 100, the temperature controller 500 located beneath the build platform 100, the build plane 400 which is level with the build platform 100, an air-tight chamber 700, and a pressure modulator 800. This embodiment of the build platform 100 includes a top surface 100A, a bottom surface 100B, and a reservoir 100D that extends between the top surface 100A and the bottom surface 100B, and also surrounds the build platform 100. The embodiments shown here employ a similar methodology to the embodiments shown in FIGS. 1A-1F, however, the phase change that the build platform 100 engages in is sublimation; the transformation from a solid state directly to a gaseous state. However, in contrast to the embodiments shown in FIGS. 1A-1F, sublimating the build platform 100 will likely require adjusting the pressure within the air-tight chamber 700 such that the conditions for the build platform 100 to sublimate can be achieved. A notable exception to this is when the build platform 100 is constructed out of iodine, which is a solid at STP and simply requires heat to sublime. Once the build platform 100 has been sublimated the force keeping the object 1000 stationary on the build plane 400 is removed, as shown in FIG. 2B. In some embodiments, the push mechanism 200 is also included, with the plow 201 extending into the air-tight chamber 700, as shown in FIG. 2C. This is the preferred method of ejecting a completed object 1000 from the print area. Once the object 1000 has been removed the temperature controller 500 and the pressure modulator 800 will work in conjunction to return the build platform 100 to a print-ready state. In some embodiments, the temperature and pressure surrounding the build platform 100 are modulated such that the removed build platform 100 reforms in a print-ready state. In other embodiments, the build platform 100 is replenished in other manners.

Figure 2D:
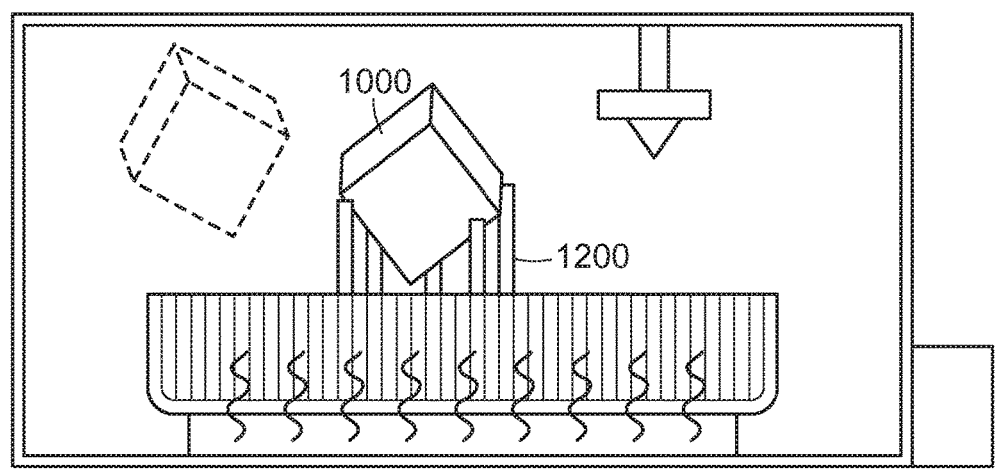
FIG. 2D is a side view, showing an example embodiment of the build platform, where the print object is supported by a support mechanism which is capable of sublimating.

In FIG. 2D, an alternative embodiment of the print area is shown. Here, the 3D printer deposits additional phase-changing material on top of the build platform 100. That is, the 3D printer prints a custom support structure 1200 to match the footprint of the object 1000, which can be sublimated by a combination of varying the temperature and pressure inside the air-tight chamber 700. This custom support structure 1200 supports the object 1000 against gravity as required and allows the object 1000 to be easily deposited thereon. After the object 1000 has been successfully printed, the support structure 1200 will change phase and will no longer be adhered to the object 1000, allowing the object 1000 to be easily removed. The support structure 1200 can be deposited by the same head that prints the object 1000, or may be deposited by a separate print head.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made, and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a system and method for automated successive three-dimensional printing. The disclosure is illustrated by example in the drawing figures, and throughout the written description. It should be understood that numerous variations are possible while adhering to the inventive concept. Such variations are contemplated as being a part of the present disclosure.

What is claimed is:

1. A method of ejecting an object from a print area, the object being printed by a 3-dimensional printer, the print area comprising a build plane, a build platform constructed entirely out of a material with a melting point between 40° C. and 55° C., the build platform having a top surface, a bottom surface, and a reservoir configured to contain the build platform, a push mechanism, having a horizontal actuator attached to a plow, where the plow is located proximately to the build platform, the horizontal actuator being configured to provide sufficient force to eject the object beyond the build platform, and a temperature regulator, located below the bottom surface, the method comprising the steps of:
   providing, by the 3-dimensional printer, a printed object, wherein the printed object is adhered to the top surface of the build platform;
   heating the build platform, by the temperature regulator, to at least the melting point of the build platform;
   allowing, the build platform to melt and the printed object to become disjoined from the top surface of the build platform; and
   pushing the printed object off the build platform by the plow of the push mechanism.

2. The method of claim 1, wherein the material is a gallium or a gallium-alloy.

3. The method of claim 1, further comprising the step of cooling, by the temperature regulator such that the build surface deposits within the reservoir.

4. A method of ejecting an object from a print area, the object being printed by a 3-dimensional printer, the print area comprising a build plane, a build platform, having a top surface, a bottom surface, and a reservoir that extends therebetween and surrounds the build platform, a push mechanism, having a horizontal actuator attached to a plow, where the plow is located proximately to the build platform, the horizontal actuator being configured to provide sufficient force to eject the object beyond the build platform, and a temperature regulator, located below the bottom surface, an air-tight chamber configured to envelope the build platform, the push mechanism, and the temperature regulator, the method comprising the steps of:

providing, by the 3-dimensional printer, a printed object, wherein the printed object is adhered to the top surface of the build platform;

heating the build platform, by the temperature regulator, to a sublimation point of the build platform;

allowing, the build platform to sublimate and the printed object to become disjoined from the top surface of the build platform; and pushing the printed object off the build platform by the plow of the push mechanism.

5. The method of claim 4, wherein the step of heating the build platform is followed by the step of changing the pressure in the air-tight chamber, by a pressure modulator.

6. The method of claim 5, further comprising the step of cooling, by the temperature regulator and changing the pressure, by the pressure modulator such that the build surface deposits within the reservoir.

\* \* \* \* \*